United States Patent
Montemurro et al.

(10) Patent No.: US 12,445,185 B2
(45) Date of Patent: *Oct. 14, 2025

(54) NULL DATA PACKET ANNOUNCEMENT (NDPA) FRAME INDICATION

(71) Applicant: HUAWEI TECHNOLOGIES CO., LTD., Shenzhen (CN)

(72) Inventors: Michael Montemurro, Kanata (CA); Jung Hoon Suh, Kanata (CA); Osama Aboul-Magd, Kanata (CA); Stephen McCann, Kanata (CA); Yan Xin, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,404

(22) Filed: May 8, 2024

(65) Prior Publication Data
US 2024/0364406 A1 Oct. 31, 2024

Related U.S. Application Data

(63) Continuation of application No. 17/490,414, filed on Sep. 30, 2021, now Pat. No. 12,021,594.

(51) Int. Cl.
*H04K 1/10* (2006.01)
*H04B 7/06* (2006.01)

(52) U.S. Cl.
CPC ......... *H04B 7/0643* (2013.01); *H04B 7/0626* (2013.01)

(58) Field of Classification Search
CPC ... H04B 7/0643; H04B 7/0626; H04W 84/12; H04W 24/10

(Continued)

(56) References Cited

U.S. PATENT DOCUMENTS

| 8,971,303 | B2 | 3/2015 | Lee |
| 10,020,919 | B2* | 7/2018 | Lee ..................... H04W 72/121 |

(Continued)

FOREIGN PATENT DOCUMENTS

| CN | 103141044 A | 6/2013 |
| CN | 107667497 A | 2/2018 |

(Continued)

OTHER PUBLICATIONS

IEEE Std 802.11ax—IEEE Standard for Information Technology—Telecommunications and Information Exchange between Systems—Local and Metropolitan Area Networks—Specific Requirements, Part 11: Wireless LAN Medium Access Control, (MAC) and Physical Layer (PHY) Specifications, Amendment 1: Enhancements for High-Efficiency WLAN, 2021.

(Continued)

*Primary Examiner* — Helene E Tayong

(57) ABSTRACT

The present disclosure provides methods and apparatus related to NDPA frame indication. An aspect of the disclosure provides a method. The method includes sending, to one or more stations (STAs), a request for channel state information (CSI). The request includes a null data packet announcement (NDPA) frame including a first field and a second field. The first field indicates presence of the second field, and the second field indicates a variant of the NDPA frame. The method further includes receiving, from the one or more STAs, a CSI feedback response based on the request. In some embodiments, the first field is one of a sounding dialog token field and indicates the presence of the second field via at least two bits. In some embodiments, the first field is a frame control field and indicates the second field via a 4-bit subtype subfield.

22 Claims, 12 Drawing Sheets

(58) Field of Classification Search
USPC .......................................................... 375/260
See application file for complete search history.

(56) References Cited

U.S. PATENT DOCUMENTS

| | | | |
|---|---|---|---|
| 10,924,955 B2* | 2/2021 | Lim | H04W 24/10 |
| 2011/0199946 A1* | 8/2011 | Breit | H04L 25/03343 |
| | | | 455/226.1 |
| 2016/0262051 A1 | 9/2016 | Merlin | |
| 2017/0111148 A1 | 4/2017 | Park | |
| 2019/0132155 A1 | 5/2019 | Jiang | |
| 2019/0349067 A1 | 11/2019 | Huang | |
| 2020/0068655 A1 | 2/2020 | Ghosh et al. | |
| 2020/0132857 A1 | 4/2020 | Berger et al. | |
| 2020/0274588 A1* | 8/2020 | Jiang | H04B 7/024 |
| 2020/0358486 A1 | 11/2020 | Suh et al. | |
| 2021/0336752 A1 | 10/2021 | Kwon et al. | |
| 2022/0038241 A1 | 2/2022 | Vermani et al. | |
| 2022/0070710 A1 | 3/2022 | Lim | |
| 2022/0158696 A1 | 5/2022 | Jeon | |
| 2023/0098549 A1 | 3/2023 | Montemurro | |
| 2023/0300649 A1* | 9/2023 | Mei | H04B 7/0626 |
| | | | 370/252 |
| 2024/0072863 A1* | 2/2024 | Suh | H04L 1/0026 |

FOREIGN PATENT DOCUMENTS

| | | |
|---|---|---|
| EP | 3133762 B1 | 8/2020 |
| EP | 3866505 A1 | 8/2021 |
| WO | 2021175124 A1 | 9/2021 |
| WO | 2023123000 A1 | 6/2023 |

OTHER PUBLICATIONS

IEEE P802.11be—IEEE P802.11be™/D3.0 Draft Standard for Information technology—Telecommunications and information exchange between systems Local and metropolitan area networks—Specific requirements Part 11: Wireless LAN Medium Access Control, (MAC) and Physical Layer (PHY) Specifications, Amendment 8: Enhancements for extremely high throughput (EHT), Jan. 2023.

IEEE 802.11-20/0062/r0, BW Negotiation, TXOP Protection with >160MHz PPDU and Puncture Operation, Jan. 6, 2020.

J. Suh, et. al., "NDPA for Sensing", TGbf, 21/1896r2, Nov. 2021 (IEEE 802.11-21).

J. Suh, et. al., "Parameters for sub-7 GHz Sensing NDPA", TGbf, 22/1535r1, Jan. 2022 (IEEE 802.11-22).

Wook Bong Lee et al. IEEE P802.11 Wireless LANs, D0.3 CR for Spatial Stream And MIMO Enhancement, IEEE 802.11-21/0272r4, Feb. 18, 2021, total 30 pages.

* cited by examiner

NULL DATA PACKET ANNOUNCEMENT (NDPA) FRAME INDICATION

CROSS-REFERENCE TO RELATED APPLICATIONS

This application is a continuation of U.S. patent application Ser. No. 17/490,414 entitled "NULL DATA PACKET ANNOUNCEMENT (NDPA) FRAME INDICATION" filed Sep. 30, 2021, the entire contents of which are hereby incorporated by reference.

FIELD OF THE INVENTION

The present invention pertains to the field of communication networks, and in particular to a method and a frame format related to NDPA frame indication.

BACKGROUND

The existing NDPA frame format in the IEEE 802.11be (11be) Draft 1.0 may only indicate a limited number of NDPA variants. For example, the existing NDPA frame may be limited to indicating the following amendments: very high throughput (VHT) NDPA, high efficiency (HE) NDPA, ranging NDPA, and extremely high throughput (EHT) Release 1 (R1) NDPA and thus do not support future amendment versions of NDPA variants.

Therefore, there is a need for a method and a frame format that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides methods and apparatus related to NDPA frame indication. A first aspect of the disclosure may provide for a method. The method includes sending, by an access point (AP) to one or more stations (STAs), a request for channel state information (CSI). The request includes a null data packet announcement (NDPA) frame including a first field and a second field. The first field indicates presence of the second field, and the second field indicates a variant of the NDPA frame. The method further includes receiving, by the AP from the one or more STAs, a CSI feedback response based on the request. The method may provide for an enhanced frame format that supports future NDPA variants. The method may support future NDPA variants without resorting to creating an additional control frame.

In some embodiments of the first aspect, the first field is a sounding dialog token field. In some embodiments, the sounding dialog token field indicates the presence of the second field via at least two bits. In some embodiments, the second field includes at least 16 bits. The method may provide for a practical approach for indicating the presence of the NDPA variant field.

In some embodiments of the first aspect, the second field further indicates one or more of: NDPA version information, a sensing announcement frame, a vendor specific NDPA, information exchange frames among collaborated access points (APs), and sounding dialog token number information. In some embodiments of the first aspect, some bits of the second field are reserved for indicating one or more of: information common to recipient stations (STA) and an extension of the second field. The method may provide for sharing relevant information with recipient STAs. In some embodiments, the $11^{th}$ bit of the second field is set to a disambiguation subfield. The method may provide for backward compatibility with legacy devices.

In some embodiments of the first aspect, the first field is a frame control field. In some embodiments, the frame control field indicates the second field via a 4-bit subtype subfield. In some embodiments, the second field indicates one or more of: the variant of the NDPA frame and sounding dialog token number information. In some embodiments, the second field includes a first subfield and a second subfield, where the first subfield indicates the variant of the NDPA frame, and the second subfield indicates the sounding dialog token number information. In some embodiments of the first aspect, the 4-bit subtype subfield is a control frame extension. In some embodiments the 4-bit subtype subfield is set to a reserved subfield. In some embodiments, the control frame extension indicates a third field of the NDPA frame, and the first field indicates the presence of the second field via the third field. The method may leverage features of the frame format for indicating the presence of the NDPA variant field, thereby enhancing the frame format.

In some embodiments, the second field indicates a third field of the NDPA frame via an extension set to decimal 221, as an example value, the third field indicating a vendor-specific variant of the NDPA frame. In some embodiments, the first subfield indicates a third field of the NDPA frame via an extension set to decimal 221, as an example value, the third field indicating a vendor-specific variant of the NDPA frame. The method may provide for accommodating vendor-specific NDPAs.

A second aspect of the disclosure may provide for an apparatus including modules configured to perform the methods, according to the first aspect described herein.

According to a third aspect, an apparatus is provided, where the apparatus includes: a memory, configured to store a program; a processor, configured to execute the program stored in the memory, and when the program stored in the memory is executed, the processor is configured to perform the methods in the first aspect described herein.

According to a fourth aspect, a computer readable medium is provided, where the computer readable medium stores program code executed by a device, and the program code is used to perform the methods in the first aspect described herein.

According to a fifth aspect, a chip is provided, where the chip includes a processor and a data interface, and the processor reads, by using the data interface, an instruction stored in a memory, to perform the methods in the first aspect described herein.

Other aspects of the disclosure provide for apparatus, and systems configured to implement the methods according to the first aspect disclosed herein. For example, wireless stations (STAs) and access points (APs) can be configured with machine readable memory containing instructions, which when executed by the processors of these devices, configures the devices to perform the methods disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Channel State Information (CSI) capabilities were first introduced in IEEE 802.11n in the context of multiple-input and multiple-output (MIMO). The CSI training sequence, as may be appreciated by a person skilled in the art, may be designed to measure the channel characteristics between a transmitter and a receiver. CSI may represent how an electromagnetic signal propagates from a transmitter to a receiver and the combined effect of scattering, fading, and power decay with distance of the signal.

CSI may reflect the wireless signal propagation characteristics for a link from a transmitter to a receiver at certain carrier frequencies. CSI measurements may include information when wireless signals transmit through surrounding objects and humans in time, frequency, and spatial domains. CSI measurements may include amplitude variation in CSI in the time domain, phase shifts in CSI in the spatial and frequency domains (e.g., transmit/receive antennas and carrier frequencies), phase shifts in CSI in the time domain.

Figure 1:
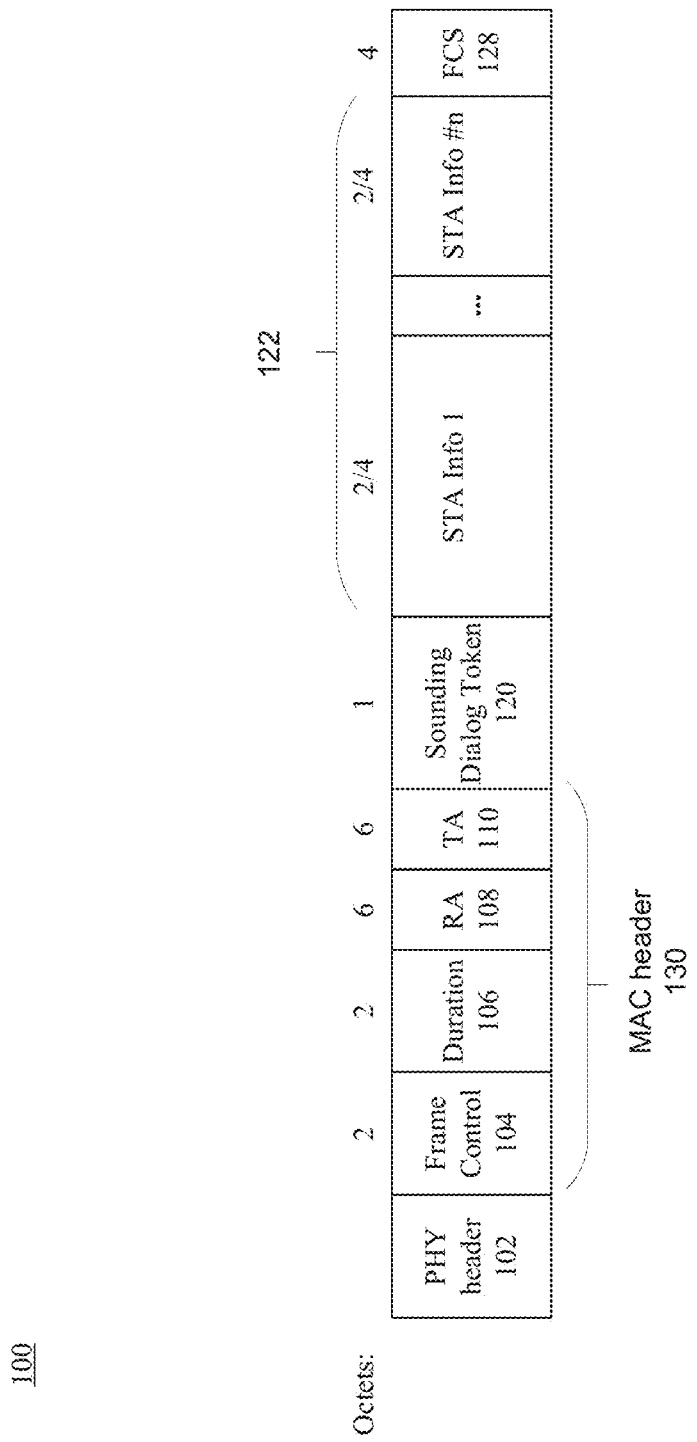
FIG. 1 illustrates an NDPA frame format in the IEEE Std 802.11™-2020.

FIG. 1 illustrates an NDPA frame format in the IEEE Std 802.11™-2020. The NDPA frame format 100 comprises fields including: physical layer (PHY) header 102, frame control 104, duration 106, receiver address (RA) 108, transmitter address (TA) 110, sounding dialog token 120, one or more station (STA) information 122 (e.g., STA Info 1, . . . , STA Info n) and frame check sequence (FCS) 128. Referring to NDPA frame format 100, the portion of the frame including the frame control field 104, the duration field 106, the RA field 110 and the TA field 110 may be referred to as the MAC header 130.

Each field of the frame format 100 is allocated a certain size. The frame control field 104 and the duration field are each assigned 2 octets. The RA field 108 and the TA field 110 are each assigned 6 octets. The sounding dialog token field 120 is assigned 1 octet. Each of the STA info field (e.g., STA Info 1, . . . , STA Info n) is assigned 2 or 4 octets. And the FCS field is assigned 4 octets. Each octet is 8 bits or 1 byte.

As may be appreciated by a person skilled in the art, of the 8 bits allocated to the sounding dialog token field 120, the first two bits are used to indicate the IEEE 802.11 amendment version of the NDPA frame. The first two bits have been used up to indicate the following four amendments: VHT, Ranging, HE and EHT R1. As such, the existing version of the NDPA frame format is not extensible beyond the 11az amendment and my not support future NDPA versions. The existing sounding dialog token field 120 is further described herein, in reference to FIG. 2A and FIG. 2B.

Embodiments described herein may provide for an enhanced NDPA frame format that may support future variants of the NDPA frame.

As discussed herein, the existing NDPA frame format does not support future amendments, as the EHT R1 variant consumes the last value of the Sounding Dialog Token version indication bits.

Figures 2A, 2B:
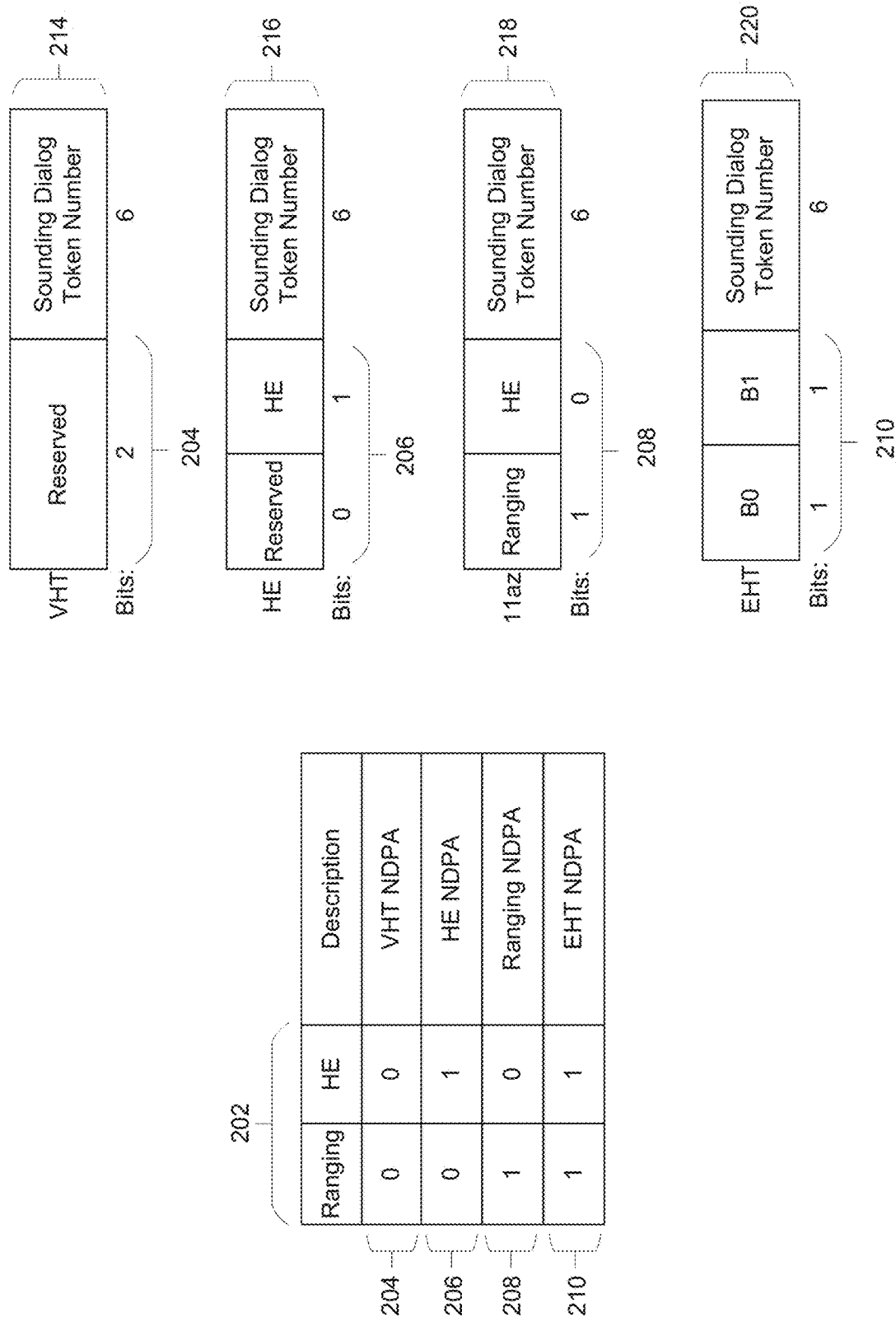
FIG. 2A and FIG. 2B illustrate allocation of the first two bits of the existing NDPA sounding dialog token field.

FIG. 2A and FIG. 2B illustrate allocation of the first two bits of the existing NDPA sounding dialog token field. As illustrated, the first two bits 202 of the NDPA sounding dialog token field is used to indicate four NDPA versions: VHT 214, HE 216, Ranging 218 and EHT R1 220. The first two bits 202 may be set to (0, 0) 204 to indicate a very high throughput (VHT) NDPA 214 (IEEE 802.11ac). The first two bits 202 may further be set to (0, 1) 206 to indicate a high efficiency (HE) NDPA 216 (IEEE 802.11ax-11ax NDPA). The first two bits 202 may further be set to (1, 0) 208 to indicate a ranging NDPA 218 (11az NDPA). The first two bits 202 may further be set to (1, 1) 210 to indicate an extremely high throughput (EHT) Release 1 (R1) NDPA 220 (11be NDPA). As illustrated, the first two bits are already designated to indicate 4 different versions for the NDPA frame. Accordingly, the existing version of the NDPA frame is not extensible beyond the 11az amendment and my not support future NDPA versions. For example, if a future EHT Release 2 (R2) amendment changes the subfields of the STA Info field, then the existing NDPA frame may not support such a future amendment.

Embodiments described herein may provide for an enhanced NDPA frame format for indicating future amendment variants of the NDPA frames. Embodiments described herein may further provide for an NDPA variant field for indicating future variants of the NDPA. Embodiments described herein may further provide for an NDPA control frame for indicating an NDPA variant.

Figure 3:
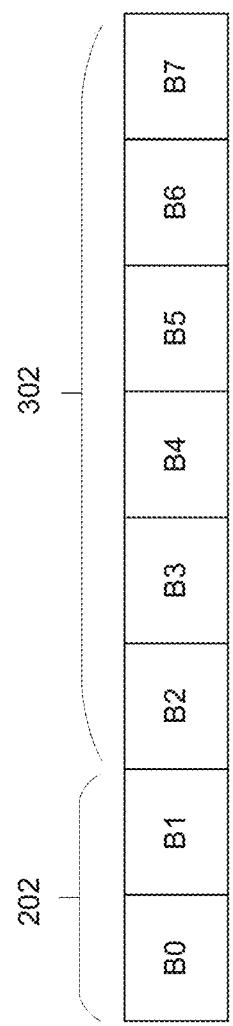
FIG. 3 illustrates a sounding dialog token number field, according to an embodiment of the present disclosure.

FIG. 3 illustrates a sounding dialog token number field, according to an embodiment of the present disclosure. Referring to FIG. 3, the 8 bits of the of the sounding dialog token number field 300 may be denoted as B0 to B7 as illustrated. As mentioned herein, the first two bits, B0 and B1, are already used up for indicating four NDPA amendments (VHT, Ranging, HE, and EHT R1). In an embodiment, the remaining 6 bits, B2 to B7, indicated by portion 302 of the sounding dialog token field 300, may be used to indicate the presence or existence of a field indicative of a variant of the NDPA.

In an embodiment, the portion 302, bits B2 to B7, may be set to a predetermined combination of "1" and "0" to indicate the presence of an NDPA variant field. In an embodiment, the first two bits, B0 and B1, may be set to "0", and the remaining 6 bits, B2 to B7, may all be set to "1" to indicate the presence of an NDPA variant field.

As may be appreciated by a person skilled in the art, the portion 302, bits B2 to B7, in the existing sounding dialog token field are used to indicate a sounding dialog token number, which indicates how many NDPA frames have been transmitted by an AP. However, in embodiments described herein, the portion 302, bits B2 to B7, may be used to indicate the presence or existence of a field indicative of an NDPA variant.

For example, by setting the 6 bits, B2 to B7, to a predetermined combination of "1" and "0", and setting the first two bits, B0 and B1 202, to "0", embodiments may provide for an indication of existence of a field indicative of a variant of the NDPA. The field may be referred to as an NDPA variant field. In an embodiment, the NDPA variant field may be 2 bytes. In some embodiments, the NDPA variant field may, immediately, follow the sounding dialog token field.

In embodiments in which B0 and B1 are set to "0", the VHT NDPA frame as defined in IEEE 802.11-2020, may need to be updated in order not to include all ones (decimal 63) in the valid range of the Sounding Dialog Token Number.

Alternatively, in some embodiments, the portion 202, bits B0 and B1, may be set to "1", in which case, the EHT R1 amendment may need to be updated in order not to include all ones (decimal 63) in the valid range of the Sounding Dialog Token Number. The update is to avoid the incremental Sounding Dialog Token Number accidentally overlapping with the NDPA Variant field indication (all "1s" in Sounding Dialog Token Number).

Accordingly, bits B2 to B7 may be set to any one or more combinations of "1" and "0" to indicate the presence of the NDPA variant field. The one or more combinations that may be used for indication of the presence of the NDPA variant field may be "Reserved" to avoid conflict or accidental overlap with the sounding dialog token number. Thus, of the 63 different combinations (of "1s" and "0s") that the 6 bits, B2 to B7, of the sounding dialog token field 300 may be set to, one combination may be reserved for the indication of the presence of the NDPA variant field, while the remaining 62 combinations may be used for indicating the sounding dialog token number.

Figure 4:
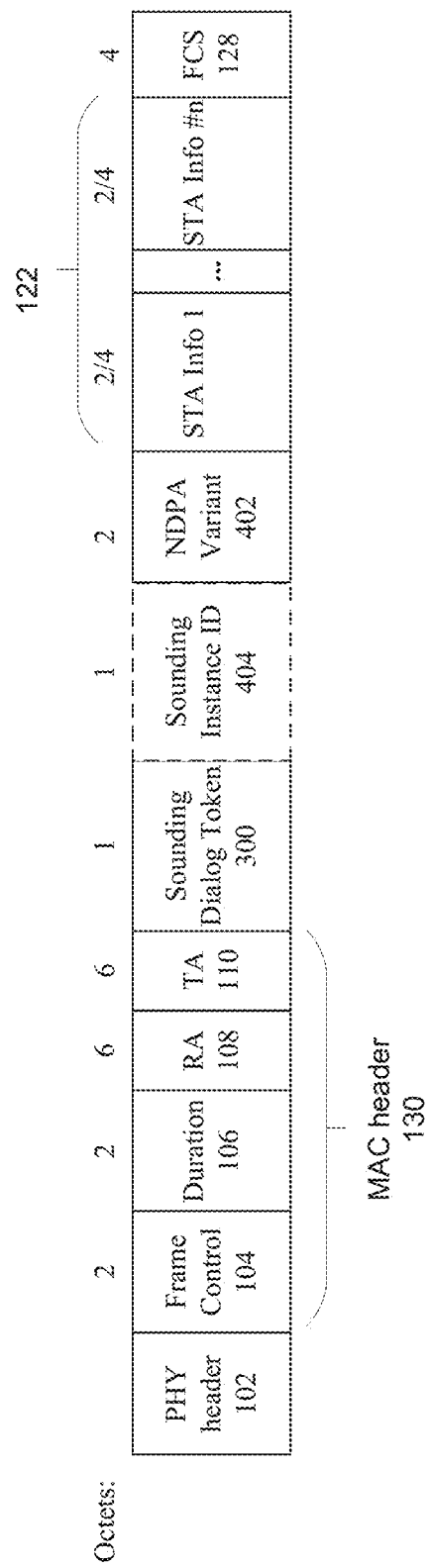
FIG. 4 illustrates an example of an enhanced NDPA frame format, according to an embodiment of the present disclosure.

FIG. 4 illustrates an example of an enhanced NDPA frame format, according to an embodiment of the present disclosure. The enhanced NDPA frame format 400 may comprise one or more fields including: PHY header 102, frame control 104, duration 106, RA 108, TA 110, sounding dialog token 300, NDPA variant 402, one or more STA information 122 (e.g., STA information 1, . . . , station information n) and FCS 128. As mentioned herein, the NDPA variant field 402 may be 2 bytes in some embodiments, though other sizes (e.g., 4 bytes etc.) may also be appropriate as appreciated by a person skilled in the art.

In some embodiments, the indication of the presence of the NDPA variant field (via the 6 bits, B2 to B7 of the sounding dialog token field 300) may further indicate the presence of another field (in addition to the NDPA variant field), which may be referred to as sounding instance identifier (ID) field 404. As illustrated, the sounding instance ID 404 may be between the sounding dialog token field 300 and the NDPA variant field 402. The sounding instance ID 404 may indicate sounding dialog token number information. In such embodiments, the NDPA variant field 402 need not to indicate sounding dialog token ID information if the sounding Instance ID 404 provides such information. In some embodiments, the sounding instance ID 404 may be 1 byte.

Figure 5:
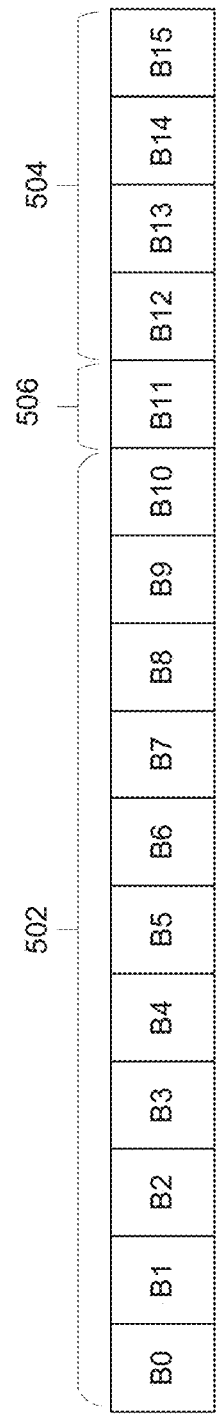
FIG. 5 illustrates an NDPA variant field of the NDPA frame format of FIG. 4, according to an embodiment of the present disclosure.

FIG. 5 illustrates an NDPA variant field of the NDPA frame format of FIG. 4, according to an embodiment of the present disclosure. In an embodiment, the NDPA variant field 402 may comprise 16 bits, which may be denoted as B0 to B15 as illustrated. Portion 502 (bits B0 to B10) and portion 504 (bits B12 to B15) of the NDPA variant field may be used to indicate the NDPA variant and some possible common information in the future amendments. Bit B11 506 may be set to a disambiguation subfield to avoid the wrong detection of AID by legacy VHT devices, thereby permitting backward compatibility.

In an embodiment, some bits of portions 502 (bits B0-B10) and 504 (bits B12 to B15) may be used to indicate one or more of: an NDPA variant for future amendments like EHT R2, EHT+; a sensing announcement frame; a special NDPA frame such as vendor specific NDPA; or information exchange frames among collaborated APs.

In some embodiments, some bits of portions 502 (bits B0-B10) and 504 (bits B12 to B15) may be used to indicate sounding dialog token information, since the sounding dialog token field 300 (e.g., portion 302 comprising bits B2 to B7) may be used up to indicate the presence of the NDPA variant. Accordingly, the NDPA variant field may further be used to indicate the sounding dialog token number information.

In some embodiments, some bits of the portions 502 and 504, may be set to "Reserved" to be used for future purposes, such as, common information for all the recipient STAs listed in the STA Info fields 122. Common information may include, bandwidth of the NDP packet, preamble puncturing pattern indication for the NDP packet, and other information as may be appreciated by a person skilled in the art. In an embodiment, one of the reserved bits may be used to indicate an extension of the NDPA variant. Accordingly, in some embodiments, a second NDPA variant field may be present, following immediately the NDPA variant field 402 (the first NDPA variant field), corresponding to the NDPA variant extension indicated in the first NDPA variant field.

As may be appreciated by a person skilled in the art, the bit allocation (of the portions 502 and 504) for indicating the different information discussed herein (e.g., NDPA amendment, Reserved fields, sounding dialog token number information) may vary based on the design of the NDPA variant field (e.g., size of the NDPA variant field).

Figures 6A, 6B:
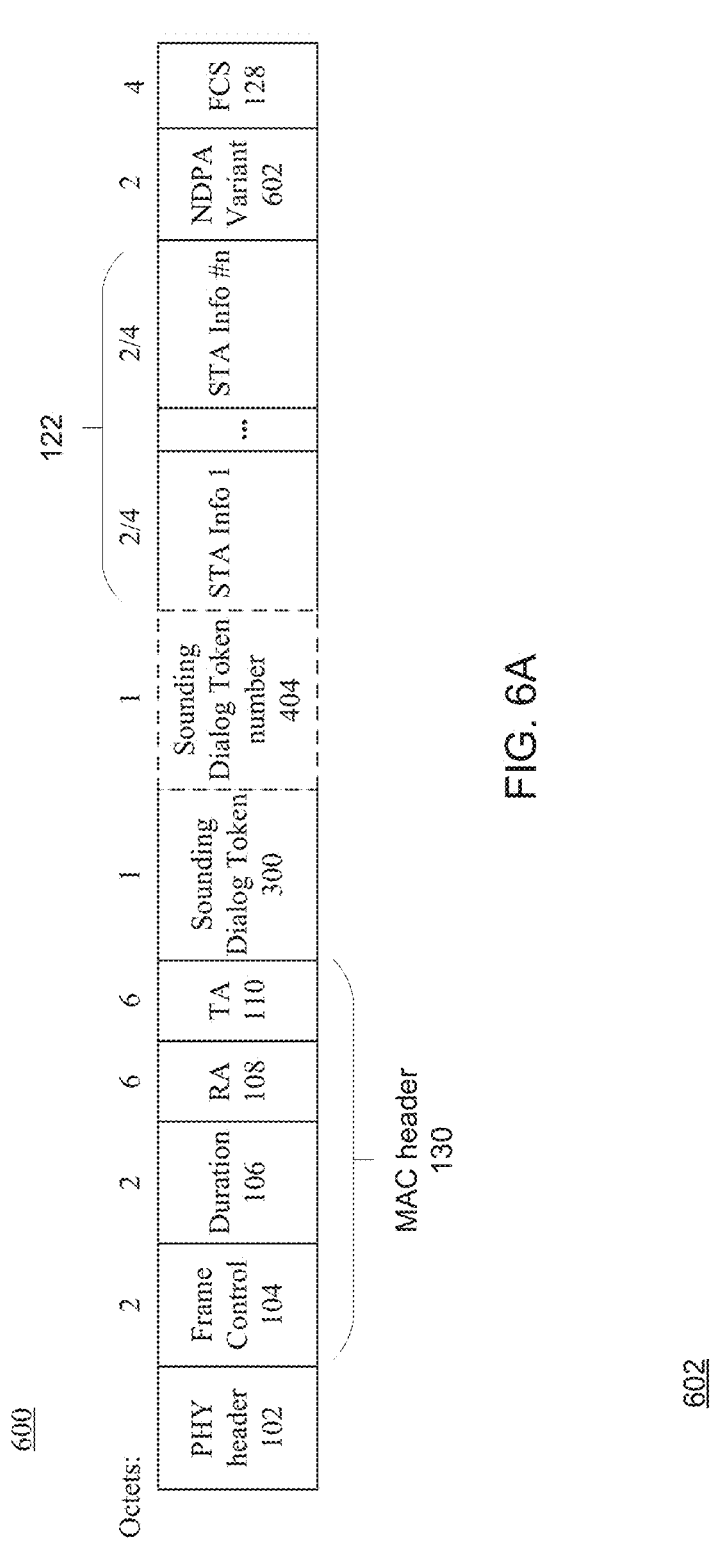
FIG. 6A illustrates another example of an enhanced NDPA frame format, according to an embodiment of the present disclosure.
FIG. 6B illustrates an NDPA variant field of the NDPA frame format of FIG. 6A, according to an embodiment of the present disclosure.

FIG. 6A illustrates another example of an enhanced NDPA frame format, according to an embodiment of the present disclosure. The NDPA frame format 600 may be similar to the NDPA frame format 400, however, the NDPA variant field 602 in FIG. 6A is positioned between the last STA info field (of the one or more STA info fields 122) and the FCS field 128. The remaining fields of NDPA frame format 600 may be similar to the NDPA frame format 400 as illustrated. By positioning the NDPA variant field 602 right before the FCS field 128, NDPA frame format 600 may prevent the legacy VHT devices from mistaking the NDPA frame format 600 as one of their own variants. Accordingly, the NDPA variant field 602 does not need a disambiguation subfield.

FIG. 6B illustrates an NDPA variant field of the NDPA frame format of FIG. 6A, according to an embodiment of the present disclosure. Similar to NDPA variant field 402 as described in reference to FIG. 5, the NDPA variant field 602 may comprise 16 bits, which may be denoted as B0 to B15 as illustrated in FIG. 6B. As discussed in reference to FIG. 6A, since the NDPA variant field 602 is positioned right before the FCS field 128, then NDPA variant field 602 need not allocate a bit (e.g., B11 in the case of NDPA variant field 402) for a disambiguation subfield. Accordingly, all 16 bits, B0 to B15, of the NDPA variant field 602 may be used to indicate one or more pieces of information (e.g., NDPA amendment, reserved fields, sounding dialog token number information) as described in reference to NDPA variant field 402.

In an embodiment, the indication of the presence of the NDPA variant field 402 or 602 may be performed via the first two bits, B0 and B1, of the sounding dialog token field 300. For example, instead of using the remaining 6 bits, B2 to B7, of the sounding dialog token field 300, the first two bits, B0 and B1, (portion 202 of the sounding dialog token field 300), may be set to "1", which may indicate the presence of the NDPA variant field 402 or 602. In such embodiments, an update to the EHT R1 amendment NDPA frame format may be made to accommodate the NDPA variant field, in order to apply this proposed NDPA frame format to the EHT R1 devices.

In an embodiment, the sounding dialog token field 300 may be used to indicate the NDPA variant. For example, in some embodiments, a first portion (e.g., 3 bits, B2 to B4) of the 6-bit Sounding Dialog Token Number (e.g., B2 to B7) may be used to indicate NDPA variant information, which may include one or more of: NDPA variant information may include: an NDPA variant for future amendments like EHT R2, EHT+; a sensing announcement frame; a special NDPA frame such as vendor specific NDPA; or information exchange frames among collaborated APs. In some embodiments the first portion (e.g., 3 bits, B2 to B4) may further be used to indicate information common to recipient STAs (e.g., bandwidth of the NDP packet, preamble puncturing pattern indication for the NDP packet, and other relevant information). In some embodiments, a second portion (e.g., 3 bits, B5 to B7) of the 6-bit Sounding Dialog Token Number may be used to indicate sounding dialog token number information. In such embodiments, the maximum value of the original Sounding Dialog Token numbering may be limited, but embodiments may avoid introducing an additional NDPA Variant field into the existing NDPA frame format. As the EHT R1 NDPA frame format may be affected in such embodiments, an update may be needed to the EHT R1 amendment to accommodate the NDPA variant.

Embodiments described herein may further provide for an enhanced NDPA frame format for supporting future amendments without resorting to creating an additional control frame.

Figure 7:
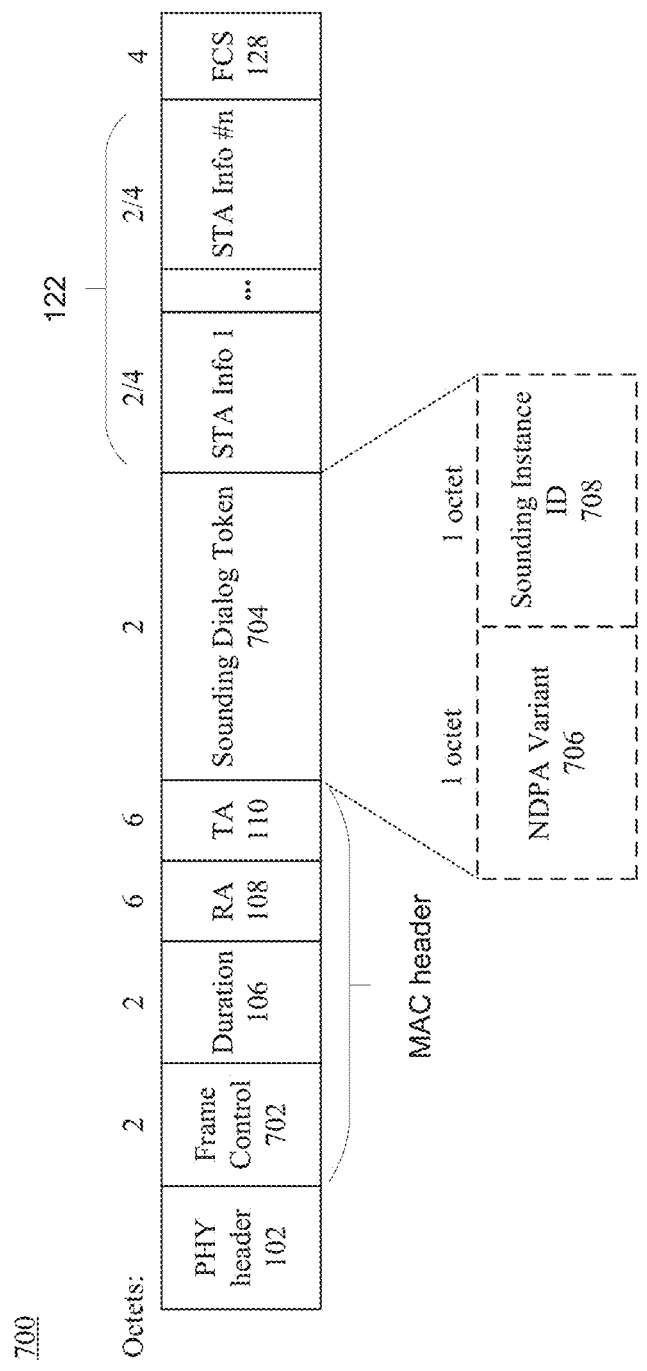
FIG. 7 illustrates another example of an enhanced NDPA frame format, according to an embodiment of the present disclosure.

FIG. 7 illustrates another example of an enhanced NDPA frame format, according to an embodiment of the present disclosure. The NDPA frame format 700 may comprise fields including one or more of PHY header field 102, frame control field 702, duration field 106, RA field 108, TA field 110, sounding dialog token field 704, one or more STA info field 122, and FCS field 128, as illustrated.

As may be appreciated by a person skilled in the art, the 4-bit Subtype subfield of the frame control field 702 (in the MAC header) is running out of control frame subtypes. However, 3 frame control field subtypes: 0000, 0001 and 0010, are still reserved. Embodiments may provide for using one of these remaining reserved frame control subtypes to define an enhanced control frame. The enhanced control frame may be referred to as an "NDPA" control frame, e.g., NDPA frame format 700.

In an embodiment, the frame control field 702 may comprise a subtype value (via using one of the three served frame control field subtypes) for indicating an enhanced NDPA frame format 700. In some embodiment, the size of sounding dialog token field 704 may be 2 bytes (an increase of 1 byte compared to the sounding dialog token field 120 of FIG. 1).

In some embodiments, the first byte (8 bits) in the sounding dialog token field 704 may be used to indicate an NDPA variant. In some embodiments, of the first 8 bits, one bit may be reserved for indicating an extension of the NDPA variant (thereby accommodating further extension for indicating the NDPA variant). In embodiments in which one bit (e.g., $8^{th}$ bit of the first 8 bits of the sounding dialog token field 704) is reserved for indicating an extension, then the remaining 7 bits (e.g., first 7 bits of the of the sounding dialog token field 704) may be used for indicating the NDPA variant.

In some embodiments, the remaining 8 bits ($2^{nd}$ byte) of the sounding dialog token field 704 may be used for indicating a sounding dialog token number index.

In some embodiments, an alternative to the sounding dialog token field 704 may be an NDPA variant field 706 and a sounding Instance ID field 708, as illustrated in dashed lines. As such, in some embodiments, instead of the sounding dialog token field 704, the NDPA frame format 700 may comprise an 8-bit NDPA variant field 706 followed by an 8-bit sounding instance ID field 708, as illustrated. The NDPA variant field 706 may indicate the variant of the NDPA, and the sounding Instance ID field 708 may indicate sounding dialog token number information.

Figure 8:
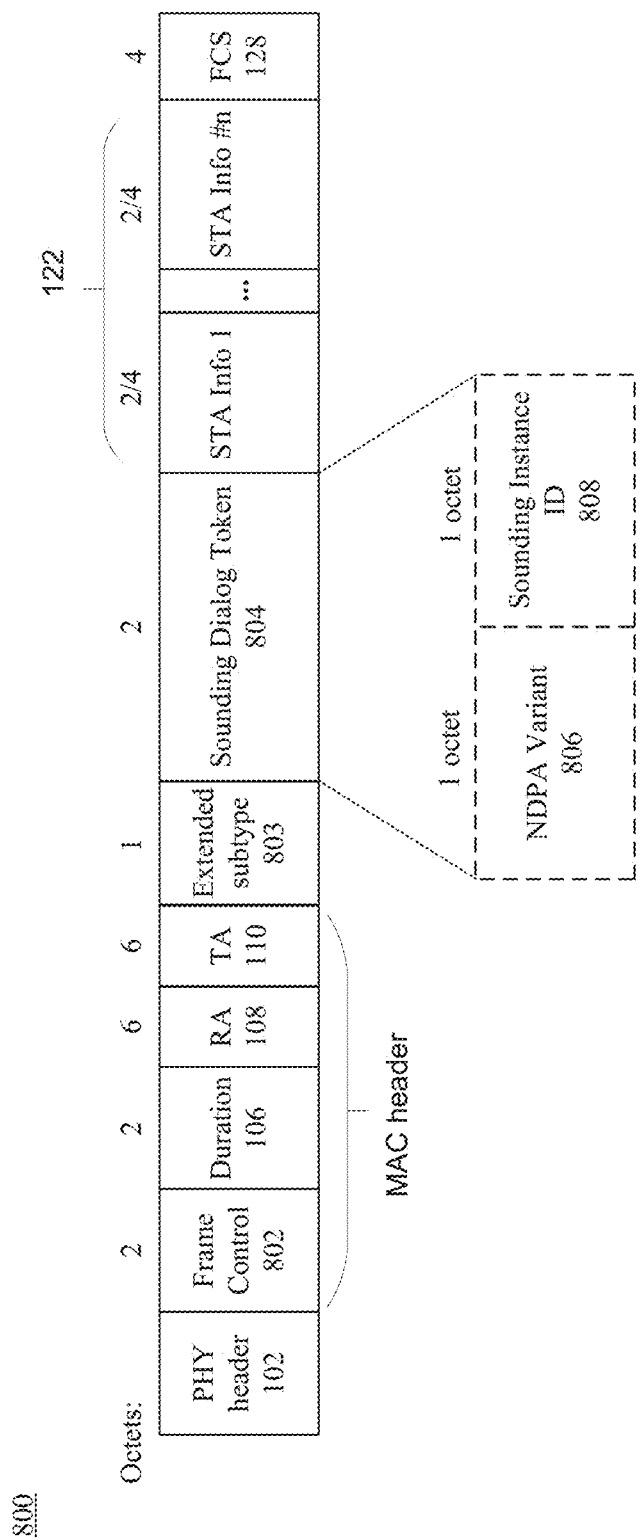
FIG. 8 illustrates another example of an enhanced NDPA frame format, according to an embodiment of the present disclosure.

FIG. 8 illustrates another example of an enhanced NDPA frame format, according to an embodiment of the present disclosure.

In some embodiments, a control frame extension may be used to define an enhanced NDPA control frame. As may be appreciated by a person skilled in the art, frame control field comprises a control subtype, e.g., control frame extension, for indicating future control frames. Embodiments may provide for using the control frame extension for creating a control frame for NDPA of future amendment variants.

The NDPA frame format 800 may comprise fields including one or more of PHY header field 102, frame control field 802, duration field 106, RA field 108, TA field 110, extended subtype field 803, sounding dialog token field 804, one or more STA info field 122, and FCS field 128, as illustrated.

In an embodiment, the 4-bit subtype subfield of the frame control field 802 in the MAC header may be set to 0110, which may indicate the control frame extension frame. The 0110 setting of the subtype subfield may further indicate the presence of the extended subtype field 803 following the TA field 110. In an embodiment, the extended subtype field 803 may be 1 byte and may provide for indicating 2 to 8 combinations of control frame types. Of these combinations, one may indicate an NDPA frame type.

As described herein, one of the extended subtypes of the extended subtype subfield 803 in the control frame extension may indicate an NDPA frame format 800. Similar to the NDPA frame format 700, the NDPA frame format 800 may comprise a sounding dialog token field 804, one or more STA info fields 122, and FCS field 128, as illustrated.

The sounding dialog token field 804 of the NDPA frame format 800 may be similar to the sounding dialog token field 704 of the NDPA frame format 700. The NDPA variant field 806 may be similar to the NDPA variant field 706. The sounding Instance ID field 808 may be similar to the sounding Instance ID field 708.

In some embodiments, the size of sounding dialog token field 804 may be 2 bytes. In some embodiments, the first byte (8 bits) in the sounding dialog token field 804 may be used to indicate an NDPA variant. In some embodiments, of the first 8 bits, one bit may be reserved for indicating an extension of the NDPA variant (thereby accommodating further extension for indicating the NDPA variant). In embodiments in which one bit (e.g., $8^{th}$ bit of the first 8 bits of the sounding dialog token field 804) is reserved for indicating an extension, then the remaining 7 bits (e.g., first 7 bits of the of the sounding dialog token field 804) may be used for indicating the NDPA variant.

The remaining 8 bits ($2^{nd}$ byte) of the sounding dialog token field 804 may be used for indicating a sounding dialog token number index.

In some embodiments, an alternative to the sounding dialog token field 804 may be an NDPA variant field 806 and a sounding Instance ID field 808, as illustrated in dashed lines. As such, in some embodiments, instead of the sounding dialog token field 804, the NDPA frame format 800 may comprise an 8-bit NDPA variant field 806 followed by an 8-bit sounding Instance ID field 808, as illustrated.

Embodiments described herein, e.g., embodiments in reference to FIGS. 7 and 8, may provide for an enhanced NDPA frame format which may accommodate future amendments.

Embodiments described herein may provide for vendor specific extensions for accommodating third parties (i.e., non-IEEE 802.11 organizations such as the Wi-Fi Alliance) to define their own vendor specific NDPA frames. Embodiments indicating vendor specific extensions may permit third parties to produce their own variants of the NDPA frame for their own technologies (e.g., Wi-Fi Alliance Aware).

In an embodiment, the $1^{st}$ octet of the NDPA variant field (e.g., NDPA variant field 402, 602, 706, 806) may be set to decimal 221 (or hex "0xDD"), which may indicate an organization identifier (ID) field as defined in clause 9.4.1.31 of IEEE Std 802.11™-2020.

Figure 9:
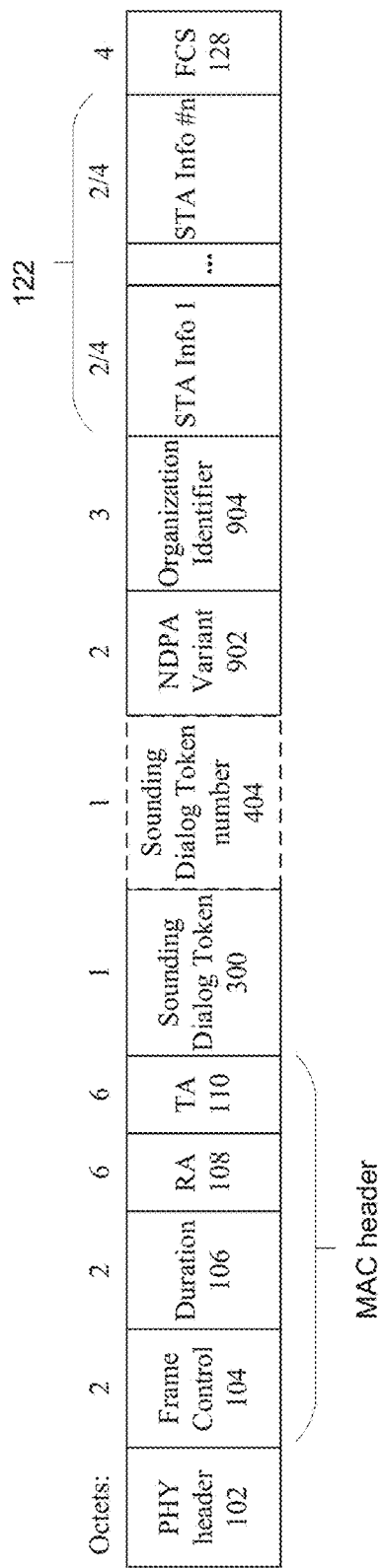
FIG. 9 illustrates an example of vendor specific NDPA frame extension, according to an embodiment of the present disclosure.

FIG. 9 illustrates an example of vendor specific NDPA frame extension, according to an embodiment of the present disclosure. NDPA frame format 900 may be similar to NDPA frame format 400, however, the $1^{st}$ octet of the NDPA variant field 902 may be set to decimal 221 (or hex "0xDD"). As may be appreciated by a person skilled in the art, the setting 221 (or hex "0xDD") is a typical indication for vendor specific extension in IEEE 802.11. Accordingly, the NDPA variant field may indicate the presence of an organization identifier field 904. In an embodiment, the size of the organization ID field 904 may be 24 bits (3 bytes) and may take on the value of an Organizationally Unique Identifier or the like, as may be appreciated by a person skilled in the art.

While the organization ID field 904 is illustrated as positioned between the NDPA variant field 902 and the one or more STA info field 122, a person skilled in the art may appreciate that the organization ID field 904 may be positioned at a different location within the NDPA frame format 900.

As mentioned herein, the NDPA variant field of the different embodiments (e.g., 602, 706, or 806) may also be set to indicate the vendor specific extension, which may further indicate the presence of a corresponding organization ID field.

Figure 10:
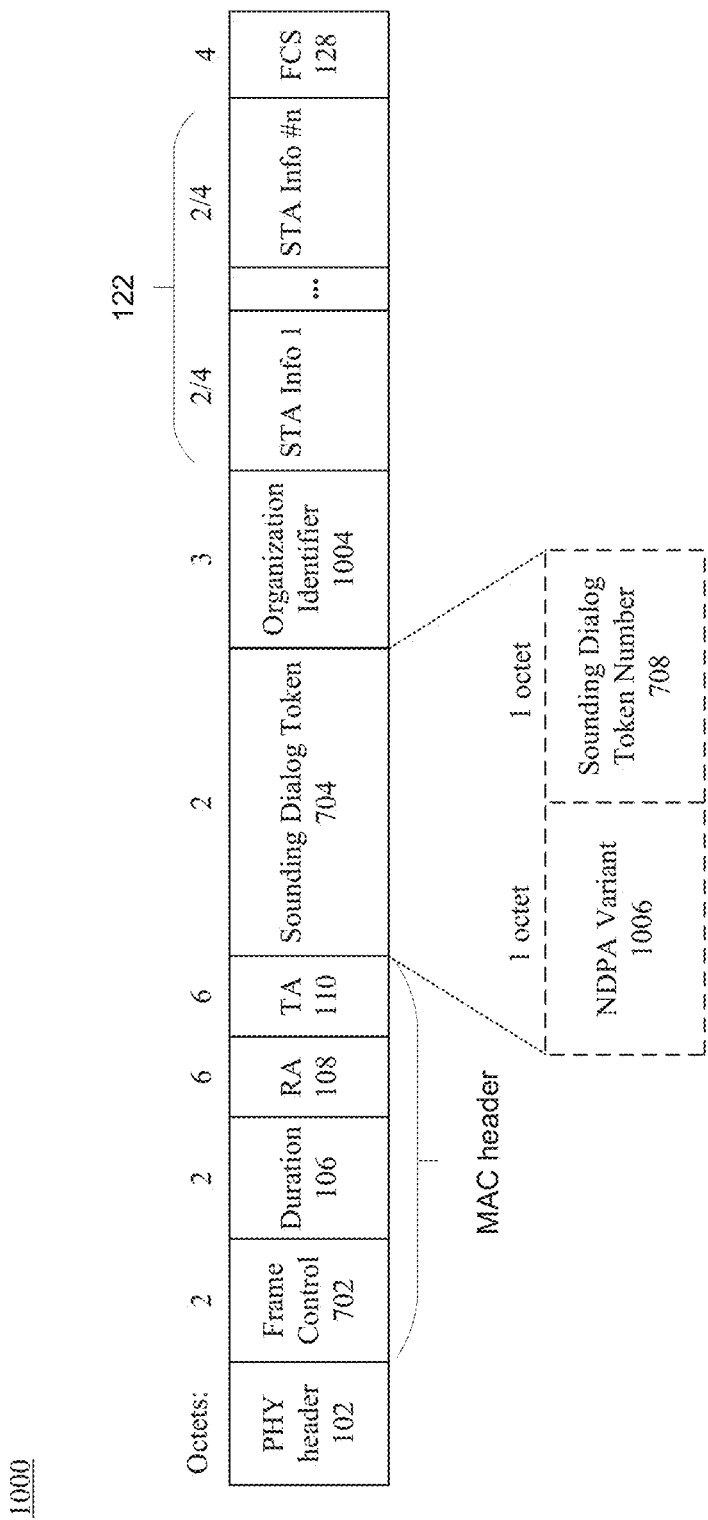
FIG. 10 illustrates another example of vendor specific NDPA frame extension, according to an embodiment of the present disclosure.

FIG. 10 illustrates another example of vendor specific NDPA frame extension, according to an embodiment of the present disclosure. The NDPA frame format 1000 may be similar to NDPA frame format 700, however, the $1^{st}$ octet of the sounding dialog token 704 or the $1^{st}$ octet of the NDPA variant field 1006 may be set to decimal 221 (or hex "0xDD") indicating vendor specific extension. As discussed in reference to FIG. 7, in some embodiments, the sounding dialog token field 704 may be replaced by the NDPA variant field 1006 and the sounding Instance ID field 708. Accordingly, the sounding dialog token field 704 or the NDPA variant field 1006, according to their respective embodiments, may indicate the presence of an organization ID field 1004. In an embodiment, the size of the organization ID field 1004 may be 24 bits (3 bytes).

While the organization ID field 1004 is illustrated as positioned right before the one or more STA info field 122, a person skilled in the art may appreciate that the organization ID field 904 may be positioned at a different location within the NDPA frame format 900.

Embodiments described herein may further provide for non-IEEE 802.11 entities to define their own vendor specific NDPA frames. Embodiments described herein may provide for using the sounding dialog token field (via one combination of 63 possible combinations) for indicating NDPA variant information or presence of a field for indicating NDPA variant information. Embodiments may provide for an NDPA variant field capable of carrying the amendment version indication, as well as some common information to one or more STA info fields. Embodiments may further provide for an enhanced NDPA frame format.

As may be appreciated by a person skilled in the art, embodiments described herein may be applied to various use applications, including but not limited to, IEEE 802.11 amendments such as 11be R2, 11be+ (e.g., future IEEE 802.11 amendments following 11be). Embodiments described herein may further be applied to sensing sounding applications.

Figure 11:
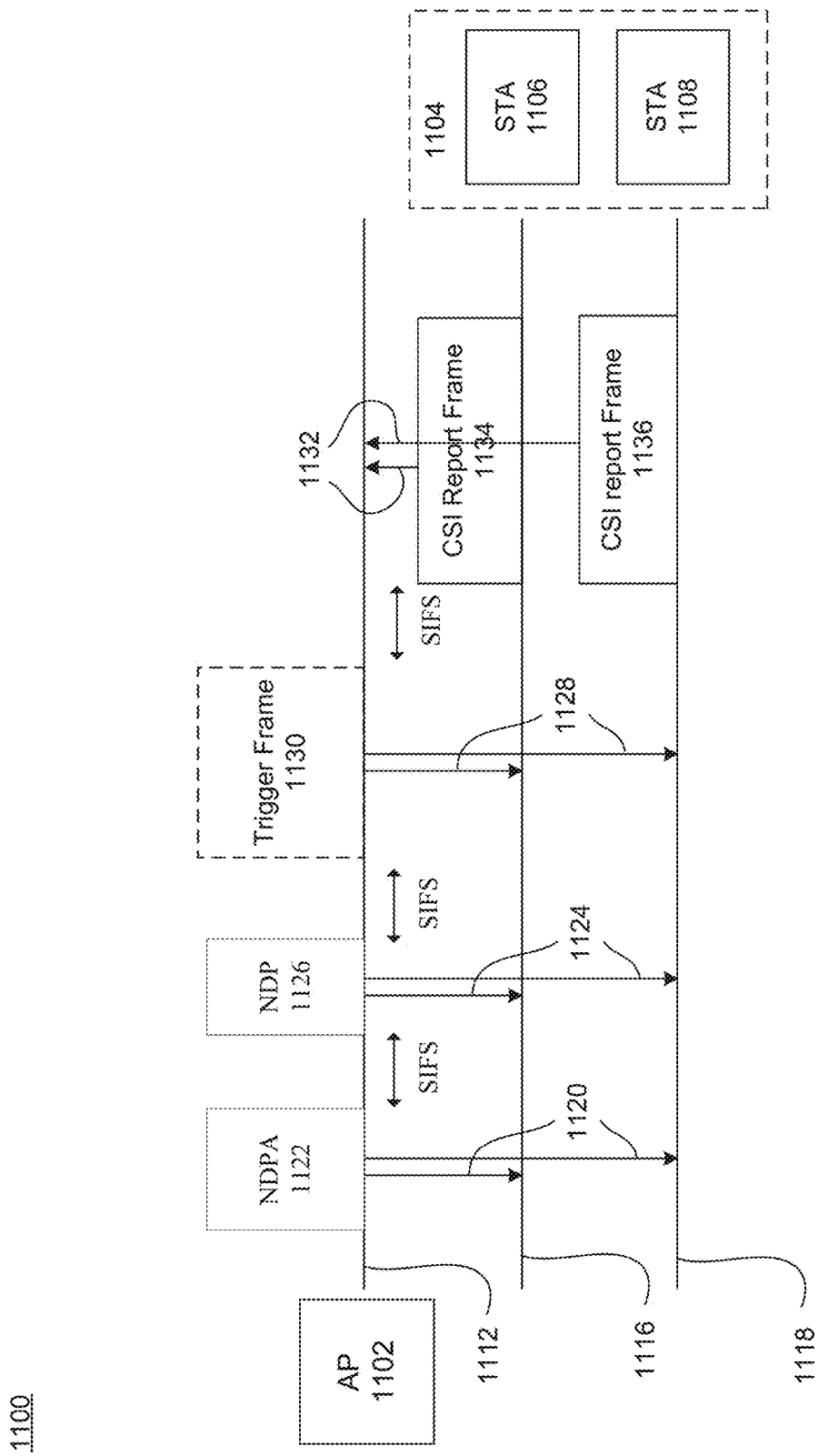
FIG. 11 illustrates a procedure, according to an embodiment of the present disclosure.

FIG. 11 illustrates a procedure, according to an embodiment of the present disclosure. The procedure 1100 may be between an access point (AP) 1102 and one or more stations (STAs) 1104 (e.g., STA 1106 and STA 1108)). While one AP 1102 is illustrated, a person skilled in the art may appreciate that a plurality of APs may be involved in the procedure 1100.

Line 1112 may represent actions performed by the AP 1102 with respect to time. Lines 1116 and 1118 may represent actions performed by STAs 1104 (e.g., respectively STA 1106 and 1108) with respect to time.

In an embodiment, AP 1102 may send a request for a CSI from the one or more STAs (e.g., STAs 106 and 108). The request may comprise sending 1120 an NDPA 1122 to each of the one or more STAs 104 (e.g., STAs 106 and 108). The NDPA 1122 may indicate the device identifiers (e.g., STA ID (i.e., association identifier (AIDs)) from which CSI is expected. NDPA 1122 may have a frame format similar to one or more NDPA frame formats described in different embodiments herein (e.g., NDPA 400, 600, 700, 800, 900 or 1000).

In some embodiments, shortest interframe spacing (SIFS) time units after sending the NDPA 1122, the sending a request for CSI may further comprise, sending by the AP 1102 to each of the one or more STAs 1104 an NDP 1126.

SIFS time units after sending the NDP 1126, the sending a request for sensing feedback may further comprise, sending 1128 a trigger frame 1130 to each of the STAs 1104.

Each one of the one or more of STAs may compute its CSI between the STA and the AP. 1102. SIFS time units after receiving the trigger frame 1130, each of the one or more STAs 1104, (e.g., STAs 1106 and 1108) may then send 1132 its computed CSI report action frames 1136 and 1134, as illustrated.

As may be appreciated by a person skilled in the art, one NDPA 1122 may be applied to a plurality of frame transmissions (e.g., NDP 1126 and trigger frame 1130) from the AP 1102 to the one or more STAs 1104 (e.g., STAs 1106 and 1108) and from the STAs 1104 to the AP 1102 (e.g., CSI report action frames 1134 and 1136).

Figure 12:
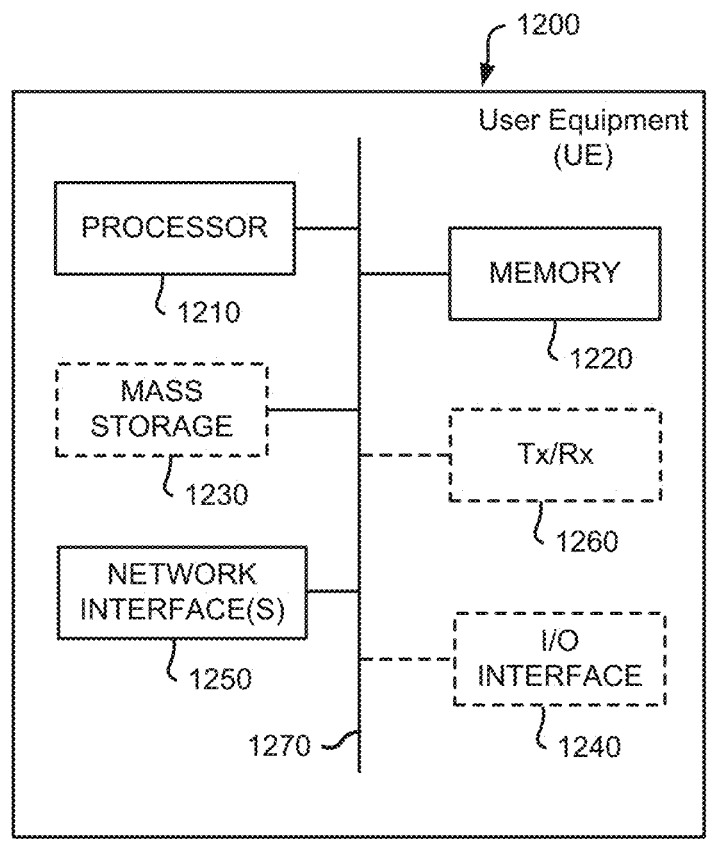
FIG. 12 is a schematic diagram of an electronic device that may perform any or all of operations of the above methods and features explicitly or implicitly described herein, according to different embodiments of the present invention.

FIG. 12 is a schematic diagram of an electronic device 1200 that may perform any or all of operations of the above methods and features explicitly or implicitly described herein, according to different embodiments of the present invention. For example, a computer equipped with network function may be configured as electronic device 1200. In some embodiments, the electronic device 1200 may be a user equipment (UE), an AP, a STA, or the like as appreciated by a person skilled in the art.

As shown, the electronic device 1200 may include a processor 1210, such as a Central Processing Unit (CPU) or specialized processors such as a Graphics Processing Unit (GPU) or other such processor unit, memory 1220, non-transitory mass storage 1230, input-output interface 1240, network interface 1250, and a transceiver 1260, all of which are communicatively coupled via bi-directional bus 1270. According to certain embodiments, any or all of the depicted elements may be utilized, or only a subset of the elements. Further, electronic device 1200 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, personal digital assistant (PDA), or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus comprising:
at least one processor and at least one machine-readable medium storing executable instructions which when executed by the at least one processor configure the apparatus for:
sending, to one or more stations (STAs), a request for channel state information (CSI), the request comprising both a null data packet announcement (NDPA) frame and a null data packet (NDP), the NDPA frame including a first field and a second field, the first field comprising one or more bits set to indicate presence of the second field, the second field being separate from the first field and indicating a variant of the NDPA frame; and
receiving, from the one or more STAs, a CSI feedback response based on the request.

2. The apparatus of claim 1, wherein the first field is a sounding dialog token field.

3. The apparatus of claim 2, wherein the sounding dialog token field indicates the presence of the second field via at least two bits.

4. The apparatus of claim 1, wherein the second field further indicates one or more of: NDPA version information, a sensing announcement frame, a vendor specific NDPA, information exchange frames among collaborated APs, and sounding dialog token number information.

5. The apparatus of claim 1, wherein some bits of the second field are reserved for indicating information common to recipient STAs.

6. The apparatus of claim 1, wherein one bit of the second field is reserved for indicating an extension of the second field.

7. The apparatus of claim 1, wherein the 11$^{th}$ bit of the second field is set to a disambiguation subfield.

8. The apparatus of claim 1, wherein the first field is a frame control field.

9. The apparatus of claim 8, wherein the frame control field indicates the second field via a 4-bit subtype subfield.

10. The apparatus of claim 9, wherein the second field indicates one or more of: the variant of the NDPA frame and sounding dialog token number information.

11. The apparatus of claim 10, wherein:
the second field comprises a first subfield and a second subfield;
the first subfield indicates the variant of the NDPA frame; and
the second subfield indicates the sounding dialog token number information.

12. A non-transitory computer-readable medium storing executable instructions which when executed by a processor of a device configure the device for:
sending, to one or more stations (STAs), a request for channel state information (CSI), the request comprising both a null data packet announcement (NDPA) frame and a null data packet (NDP), the NDPA frame including a first field and a second field, the first field comprising one or more bits set to indicate presence of the second field, the second field being separate from the first field and indicating a variant of the NDPA frame; and
receiving, from the one or more STAs, a CSI feedback response based on the request.

13. The non-transitory computer-readable medium of claim 12, wherein the first field is a sounding dialog token field.

14. The non-transitory computer-readable medium of claim 13, wherein the sounding dialog token field indicates the presence of the second field via at least two bits.

15. The non-transitory computer-readable medium of claim 12, wherein the second field further indicates one or more of: NDPA version information, a sensing announcement frame, a vendor specific NDPA, information exchange frames among collaborated APs, and sounding dialog token number information.

16. The non-transitory computer-readable medium of claim 12, wherein some bits of the second field are reserved for indicating information common to recipient STAs.

17. The non-transitory computer-readable medium of claim 12, wherein one bit of the second field is reserved for indicating an extension of the second field.

18. The non-transitory computer-readable medium of claim 12, wherein the 11$^{th}$ bit of the second field is set to a disambiguation subfield.

19. The non-transitory computer-readable medium of claim 12, wherein the first field is a frame control field.

20. The non-transitory computer-readable medium of claim 19, wherein the frame control field indicates the second field via a 4-bit subtype subfield.

21. The non-transitory computer-readable medium of claim 20, wherein the second field indicates one or more of: the variant of the NDPA frame and sounding dialog token number information.

22. The non-transitory computer-readable medium of claim 21, wherein:
the second field comprises a first subfield and a second subfield;
the first subfield indicates the variant of the NDPA frame; and
the second subfield indicates the sounding dialog token number information.

* * * * *